(12) United States Patent
Chen et al.

(10) Patent No.: US 10,746,570 B2
(45) Date of Patent: Aug. 18, 2020

(54) MASS DISPLACEMENT ESTIMATION USING BACK EMF AND MAGNETIC REFERENCE CROSSING

(71) Applicant: Apple Inc., Cupertino, CA (US)

(72) Inventors: Denis G. Chen, San Jose, CA (US); Hari Vasudevan, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 128 days.

(21) Appl. No.: 15/698,477

(22) Filed: Sep. 7, 2017

(65) Prior Publication Data

US 2018/0266849 A1    Sep. 20, 2018

Related U.S. Application Data

(60) Provisional application No. 62/471,827, filed on Mar. 15, 2017.

(51) Int. Cl.
  *G01D 5/14*     (2006.01)
  *G08B 6/00*     (2006.01)
  *G06F 3/01*     (2006.01)

(52) U.S. Cl.
  CPC ............. *G01D 5/145* (2013.01); *G06F 3/016* (2013.01); *G08B 6/00* (2013.01)

(58) Field of Classification Search
  CPC ............ G01D 5/145; G06F 3/016; G08B 6/00
  See application file for complete search history.

(56) References Cited

U.S. PATENT DOCUMENTS

| | | | |
|---|---|---|---|
| 4,737,710 A * | 4/1988 | Van Antwerp | G01D 5/147 324/207.2 |
| 9,513,709 B2 * | 12/2016 | Gregorio | G09G 3/296 |
| 2015/0115946 A1 * | 4/2015 | Ionescu | G01R 33/0029 324/244 |
| 2015/0332565 A1 | 11/2015 | Cho et al. | |
| 2016/0258758 A1 * | 9/2016 | Houston | G01C 21/20 |
| 2017/0090574 A1 | 3/2017 | Baer et al. | |

* cited by examiner

*Primary Examiner* — Farhana A Hoque
(74) *Attorney, Agent, or Firm* — Fish & Richardson P.C.

(57) ABSTRACT

In an embodiment, a single-sided or double-sided moving magnet haptic engine comprises: a frame; one or more magnetic field sources mounted to the frame and operable to generate a magnetic field and a back electromotive force (EMF) voltage; a magnetic mass positioned within the frame and operable to move within the frame along a movement axis; a comparator mounted to the frame, the comparator operable to detect the magnetic field and to generate a signal indicating a crossing of one or more magnetic references by the magnetic field; and a processor coupled to the one or more sensors and operable to estimate a displacement of the magnetic mass on the movement axis based on the back EMF voltage and the signal. Other embodiments are directed to a single-sided or double-sided moving coil haptic engine.

27 Claims, 6 Drawing Sheets

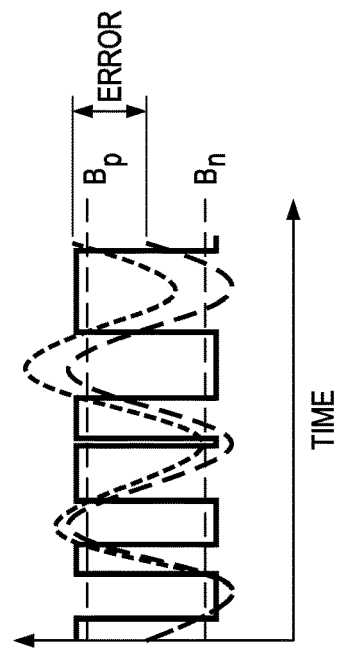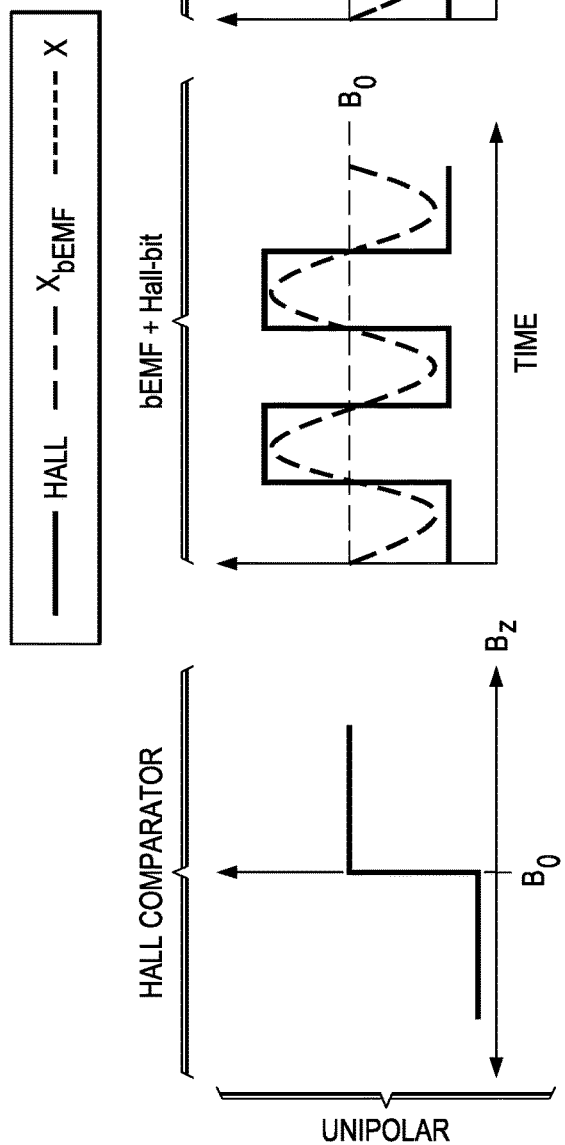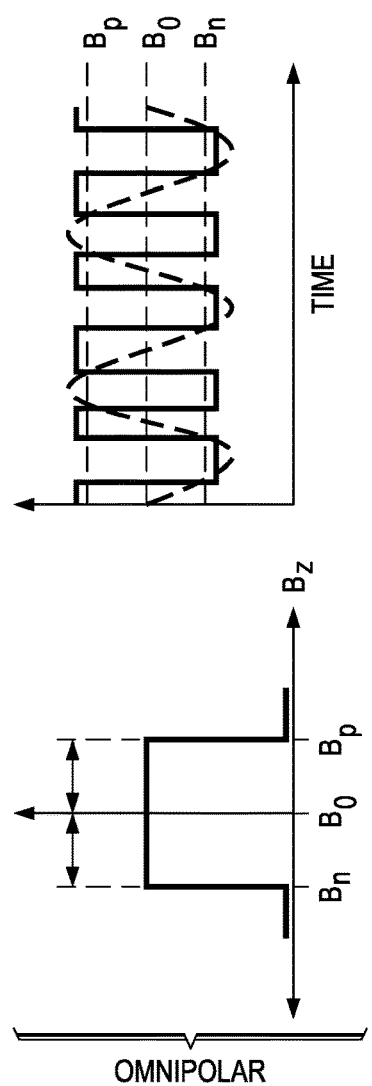
FIG. 2A  FIG. 2B  FIG. 2C
FIG. 2D  FIG. 2E  FIG. 2F

MASS DISPLACEMENT ESTIMATION USING BACK EMF AND MAGNETIC REFERENCE CROSSING

CROSS-REFERENCE TO RELATED APPLICATION

This application claims priority to U.S. Provisional Application No. 62/471,827, filed Mar. 15, 2017, the entire contents of which are incorporated herein by reference.

TECHNICAL FIELD

This disclosure relates generally to estimating mass displacement in a haptic engine.

BACKGROUND

Some mobile devices (e.g., smart phones) include a haptic engine that is configured to provide a tactile feedback sensation such as a vibration or other physical sensation to a user touching or holding the mobile device. The haptic engine can be coupled to an input surface and one or more actuators, such as piezoelectric transducers, electromechanical devices, and/or other vibration inducing devices, that are mechanically connected to the input surface. Drive electronics coupled to the one or more actuators cause the actuators to induce a vibratory response into the input surface, providing a tactile sensation to a user touching or holding the device.

Some haptic engines include a mass positioned in a frame that moves or oscillates to induce a vibratory response. A transducer can be included in the frame that varies its output voltage in response to changes in a magnetic field as the mass moves within the frame. The output voltage can be used by a control application to determine displacement of the mass on a movement axis. The control application estimates the displacement to avoid a crash and to minimize variations over a population of haptic engines. The displacement can be estimated by integrating a back electromotive force (EMF) voltage which provides an approximation of the mass velocity. This back EMF method, however, is prone to errors in coil resistance estimation and the inability of the control application to sense a low-velocity drift caused by load disturbances (e.g., a user moving the mobile device).

SUMMARY

In an embodiment, a single-sided or double-sided moving magnet haptic engine comprises: a frame; one or more magnetic field sources mounted to the frame and operable to generate a magnetic field and a back electromotive force (EMF) voltage; a magnetic mass positioned within the frame and operable to move within the frame along a movement axis; a comparator mounted to the frame, the comparator operable to detect the magnetic field and to generate a signal indicating a crossing of one or more magnetic references by the magnetic field; and a processor coupled to the one or more sensors and operable to estimate a displacement of the magnetic mass on the movement axis based on the back EMF voltage and the signal.

In an embodiment, a method comprises: generating, by one or more magnetic field sources mounted to a frame of a haptic engine, a magnetic field; driving a mass to move within the frame along a movement axis, the movement of the mass inducing a back electromotive force (EMF); detecting at least a directional component of the magnetic field and generating a signal indicating a crossing of one or more magnetic references by the directional component of the magnetic field; and estimating a displacement of the mass on the movement axis based on the back EMF voltage and the signal. Other embodiments are directed to a single-sided or double-sided moving coil haptic engine.

Particular implementations disclosed herein provide one or more of the following advantages. A Hall comparator is used to detect crossing of a magnetic reference, which is a lower cost solution than solutions using a combination of Hall sensing elements and multi-bit data converter circuits. The disclosed implementations are more robust against low-velocity drift caused by load disturbances than using EMF sensing alone. The disclosed implementations do not require an application specific integrated circuit (ASIC) on flexible printed circuit board (PCB) or be enclosed by a magnetic interference shield. The disclosed implementations are robust against z-axis shift over system life (because the reference position estimated by Hall-bit switching is ratiometric rather than based on the absolute field intensity) and use a printed circuit flex with fewer components and routing. The disclosed implementations can be manufactured using existing module assembly processes, including processes that use Ferro-fluid.

The details of the disclosed implementations are set forth in the accompanying drawings and the description below. Other features, objects and advantages are apparent from the description, drawings and claims.

DESCRIPTION OF DRAWINGS

FIG. 2A is a graph illustrating operation of a unipolar Hall comparator, according to an embodiment.

FIG. 2B is a graph of a back EMF voltage signal overlaid on a unipolar Hall comparator output signal, according an embodiment.

FIG. 2C is a graph illustrating sensing of low-velocity drift using a unipolar Hall comparator, according to an embodiment.

FIG. 2D is a graph illustrating operation of an omnipolar Hall comparator, according to an embodiment.

FIG. 2E is a graph of a back EMF voltage signal overlaid on a omnipolar Hall comparator output signal, according an embodiment FIG. 2F is a graph illustrating sensing of low-velocity drift using an omnipolar Hall comparator, according to an embodiment.

The same reference symbol used in various drawings indicates like elements.

DETAILED DESCRIPTION

Displacement of a moving mass in a haptic engine is estimated based on back EMF voltage. The estimate is corrected using output of a Hall comparator that detects when a magnetic reference is crossed. The back EMF and Hall comparator output (e.g., a binary signal) can be input to a state estimator that estimates the mass displacement in real-time. Each time the state estimator detects a change in the output of the Hall comparator due to a crossing of the magnetic reference, the Hall comparator output is used by the state estimator to correct the estimate of mass displacement. The Hall comparator can be configured as unipolar or omnipolar (e.g., switching at zero field intensity or switching at an absolute field intensity value). The absolute mechanical position of the magnetic reference (e.g., magnetic zero reference) can be calibrated during manufacture/testing. The Hall comparator can be duty-cycled to save power. Delay due to hysteresis of the Hall comparator can be compensated for in the state estimator.

Example Systems

Figure 1:
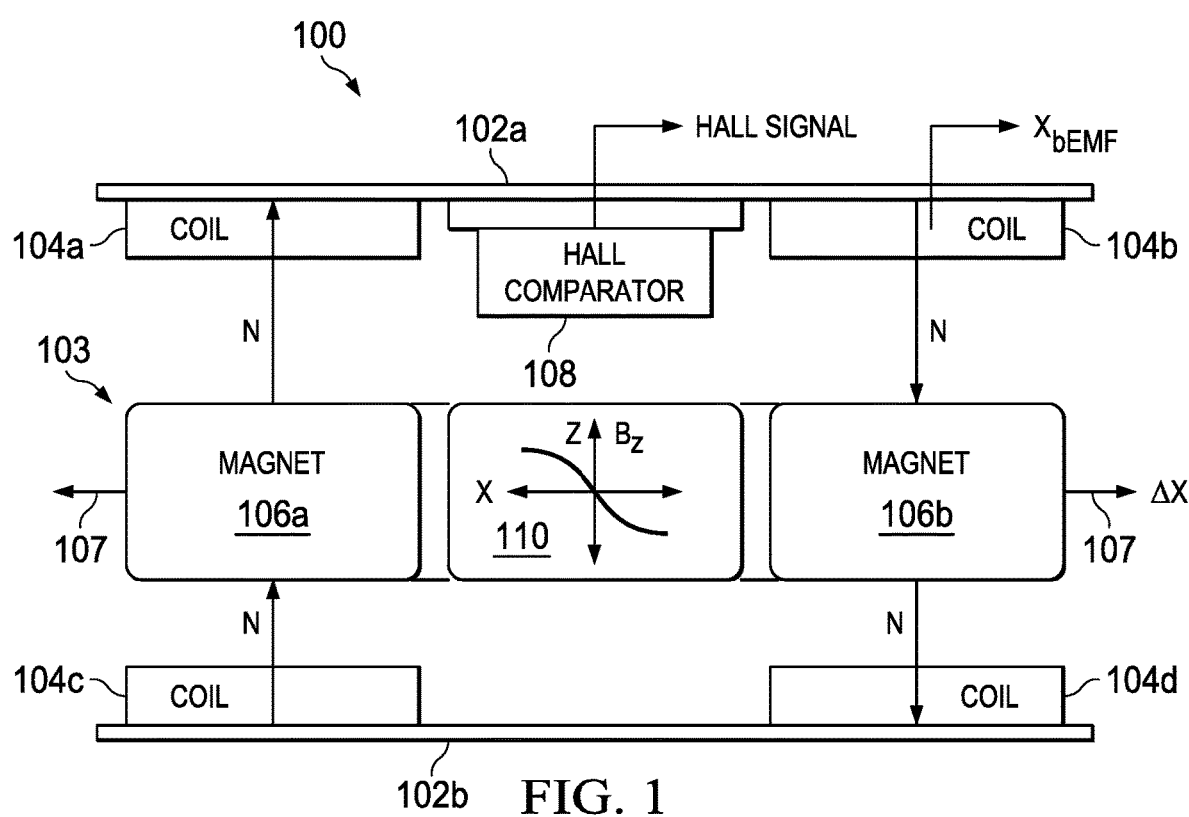
FIG. 1 is a cross-sectional view of an example double-sided, moving magnet haptic engine that uses back EMF and a Hall comparator to estimate mass displacement, according to an embodiment.

FIG. 1 is a cross-sectional view of an example double-sided, moving magnet haptic engine 100 that uses back EMF and a Hall comparator to estimate mass displacement, according to an embodiment. Haptic engine 100 includes magnetic field sources 104a-104d (e.g., coils) mounted to opposing frame portions 102a, 102b. Mass 103 is positioned within frame portions 102a, 102b. Mass 103 can be mechanically constrained (e.g., constrained by a shaft and/or other mechanical guides) to move linearly along movement axis 107 (x-axis) in two directions. Mass 103 includes magnetic portions 106a, 106b (e.g., magnets). Hall comparator 108 is mounted on a flexible printed circuit (FPC) which is attached to frame portion 102a and its operation will be described in further detail in reference to FIG. 6.

When haptic engine 100 is in operation, an alternating current that is provided through magnetic field sources 104a-104d causes a periodic Lorentz force that drives mass 103 along movement axis 107 in two directions about a magnetic reference (e.g., magnetic zero reference), which is illustrated by graph 110 for discussion purposes. A displacement Δx of mass 103 on movement axis 107 is proportional to the amplitude and frequency of the current flowing through magnetic field sources 104a-104d. In the example configuration shown, magnetic field sources 104a-104d and magnetic portions 106a, 106b of mass 103 are used to drive mass 103 along movement axis 107 and to sense the displacement of mass 103 on movement axis 107.

The displacement of mass 103 on movement axis 107 can be estimated by integrating a back EMF voltage ($V_{bEMF}$) that is generated by the magnetic field sources 104a-104d.

The back EMF voltage pushes against the current flowing in magnetic field sources 104a-104d (e.g., current flowing in coils) which induces the back EMF voltage. The back EMF voltage, $V_{bemf}$, is not directly observable but can be reconstructed. For a linear actuator, $V_{bemf}$ is given by Equation [1]:

$$V_{bemf}(t) = V_{act}(t) - (R_{act}(t)*i_{act}(t) + L_{act}(t)*i'_{act}(t)), \quad [1]$$

where $V_{act}(t)$ is the actuator voltage, $R_{act}(t)$ is the actuator resistance, $L_{act}(t)$ is the actuator inductance, $i_{act}(t)$ is the actuator current, and $i'_{act}(t)$ is the time derivative of the actuator current. The actuator resistance $R_{act}(t)$ and inductance $L_{act}(t)$ can be estimated in real-time by applying a small (e.g., 80 mV) background voltage signal at either very high (e.g. 2 kHz) or very low frequencies (e.g. 20 Hz) where the actuator is known to have virtually no displacement response (e.g., <10 um). Additionally, the resistance of the actuator may also be inferred by the change in resistance of the Hall sensing element due to thermal coupling between the actuator coil and Hall sensor. The velocity of the actuator is proportional to $V_{bemf}(t)$. Using back EMF voltage to estimate displacement of mass 103 is prone to errors in resistance $R_{act}(t)$ estimation and the inability of the control application to sense a low-velocity drift that is caused by load disturbances.

FIG. 2A is a graph illustrating a unipolar Hall comparator, according to an embodiment. In this embodiment, a 1-bit Hall comparator is assumed. Each time the sensed magnetic field along the z-axis ($B_z$) crosses the magnetic zero reference $B_0$, a pulse edge is generated at the output of the Hall comparator.

FIG. 2B is a graph of a periodic back EMF voltage signal along the x-axis ($X_{bEMF}$) overlaid on a unipolar Hall comparator output signal. As can be observed from FIG. 2B, each time the sensed magnetic field ($B_z$) crosses the magnetic zero reference $B_0$, a pulse edge is generated, resulting in a pulse train at the output of the 1-bit Hall comparator.

FIG. 2C is a graph illustrating sensing of low-velocity drift using a unipolar Hall comparator, according to an embodiment. By comparing the two dashed lines representing back EMF estimated displacement ($X_{bEMF}$, long dash) against the ground truth (short dash), one can see that the low-velocity drift error is not registered by the bEMF signal but it is clearly visible in the Hall-bit switching. If this drift error is not corrected, the estimated mass displacement will be inaccurate.

FIG. 2D is a graph illustrating an omnipolar Hall comparator, according to an embodiment. In this embodiment, a 1-bit Hall comparator is assumed. Each time the sensed magnetic field ($B_z$) crosses the magnetic reference poles $B_n$ and $B_p$, a pulse edge is generated at the output of the Hall comparator. They correspond to the field intensity observed at displacements $X_{EMF}(B_n)$ and $X_{EMF}(B_p)$, where displacement is estimated by EMF. The omnipolar Hall comparator provides twice as many pole crossing detections per cycle, which allows for the drift error to be detected and corrected more quickly by a state observer/filter. The zero reference displacement $X_{EMF}(B_0)$ (relative to EMF estimated zero displacement) can be calculated by a ratio of the switching pulse edges of the Hall comparator output signal using Equations [2] and [3]:

$$X_{EMF}(B_0) = X_{EMF}(B'_n) + A(X_{EMF}(B'_n) - X_{EMF}(B'_p)), \quad [2]$$

$$A = \frac{X_{EMF}(B_n)}{X_{EMF}(B_n) - X_{EMF}(B_p)}, \quad [3]$$

where $X_{EMF}(B_0)$ is computed at runtime and A is calibrated during manufacturing/testing. When $X_{EMF}(B_0)$ is non-zero, its value is the error in $X_{EMF}$ relative to the ground truth.

FIG. 2E is a graph illustrating a back EMF voltage signal overlaid with a omnipolar Hall comparator output signal, according an embodiment. As can be observed from FIG. 2E, each time the sensed magnetic field ($B_z$) crosses the magnetic reference poles $B_n$ and $B_p$, the output of the Hall comparator generates a pulse edge, resulting in a pulse train over time.

FIG. 2F is a graph illustrating sensing of low-velocity drift using an omnipolar Hall comparator, according to an embodiment. By comparing the two dashed lines, one can see that the low-velocity drift error increases over time. If this error is not corrected, the estimated mass displacement will be inaccurate.

Figure 3:
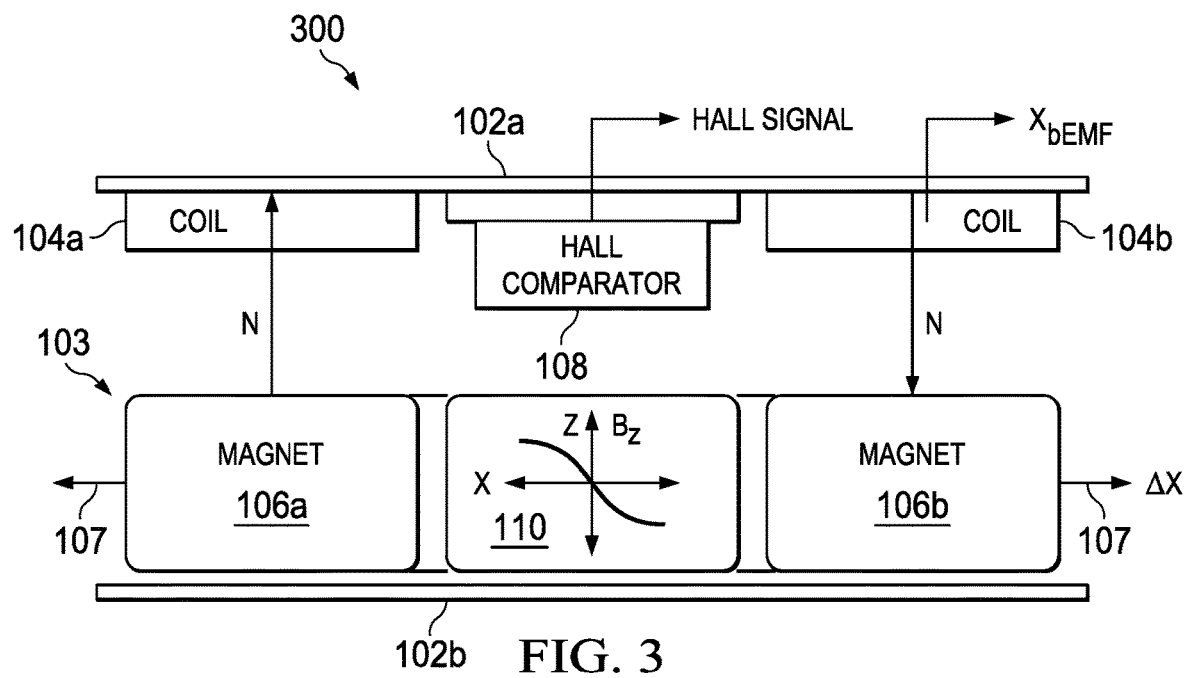
FIG. 3 is a cross-sectional view of an example single-sided, moving magnet haptic engine that uses back EMF and a Hall comparator to estimate mass displacement, according to an embodiment.

FIG. 3 is a cross-sectional view of an example single-sided, moving magnet haptic engine 300 that uses back EMF and a Hall comparator to estimate mass displacement, according to an embodiment. Haptic engine 300 includes magnetic field sources 104a, 104b (e.g., coils) mounted to frame portion 102a. Mass 103 is positioned within frame portions 102a, 102b. Mass 103 can be mechanically constrained (e.g., constrained by a shaft and/or other mechanical guides) to move linearly along movement axis 107 (x-axis) in two directions. Mass 103 includes magnetic portions 106a, 106b (e.g., magnets). Hall comparator 108 is mounted to frame portion 102a. Haptic engine 300 operates in a similar manner as haptic engine 100, except that haptic engine 300 does not include magnetic field sources 104c, 104d mounted to frame portion 102b.

Figure 4:
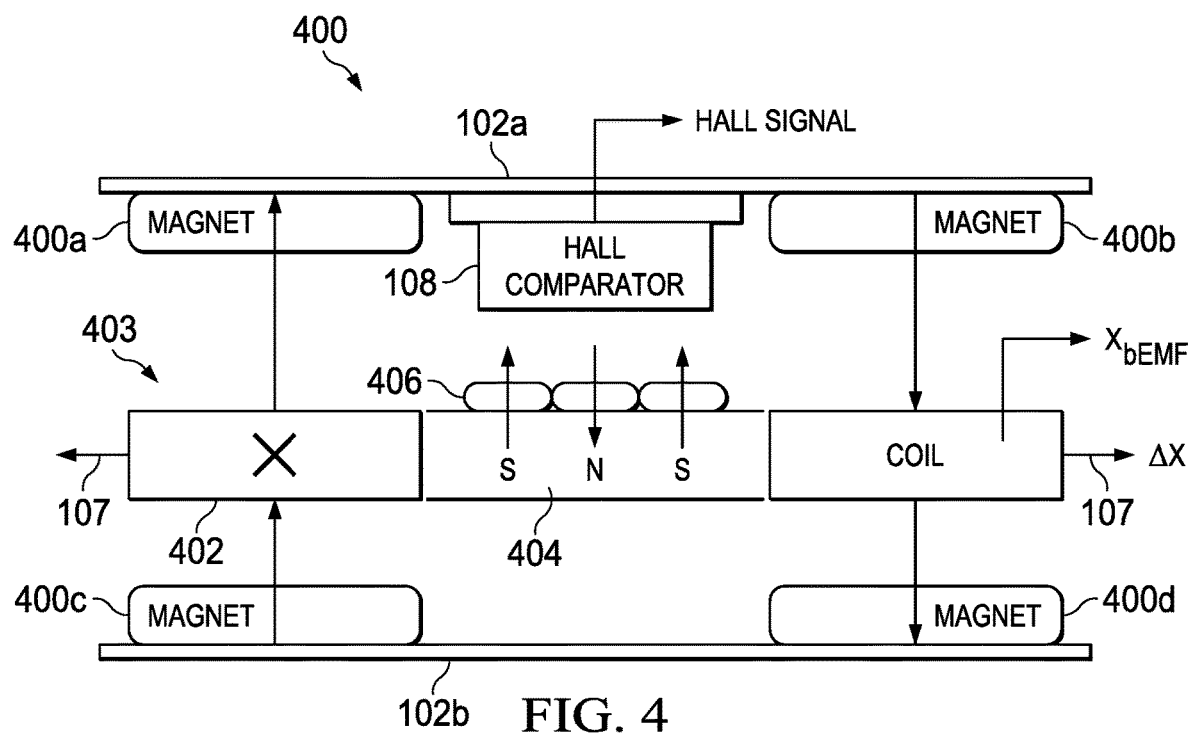
FIG. 4 is a cross-sectional view of an example double-sided, moving coil haptic engine that uses back EMF and a Hall comparator to estimate mass displacement, according to an embodiment.

FIG. 4 is a cross-sectional view of an example double-sided moving coil haptic engine 400 that uses back EMF and a Hall comparator to estimate mass displacement, according to an embodiment. Haptic engine 400 includes opposing magnets 400a-400d mounted to opposing frame portions 102a, 102b. Mass 403 is positioned within frame portions 102a, 102b. Mass 403 can be mechanically constrained (e.g., constrained by a shaft and/or other mechanical guides) to move linearly along movement axis 107 (x-axis) in two directions. Mass 403 includes coil 402 surrounding core 404. Sensing magnets 406 are mounted on core 404. Three sensing magnets 406 are shown in this example. In other embodiments, any arbitrary number of sensing magnets with alternating polarity can be used. Hall comparator 108 is mounted to frame portion 102a. Haptic engine 400 operates in a similar manner as haptic engines 100 and 300, except that haptic engine 400 moves coil 402, relative to fixed magnets 400a-400d.

Figure 5:
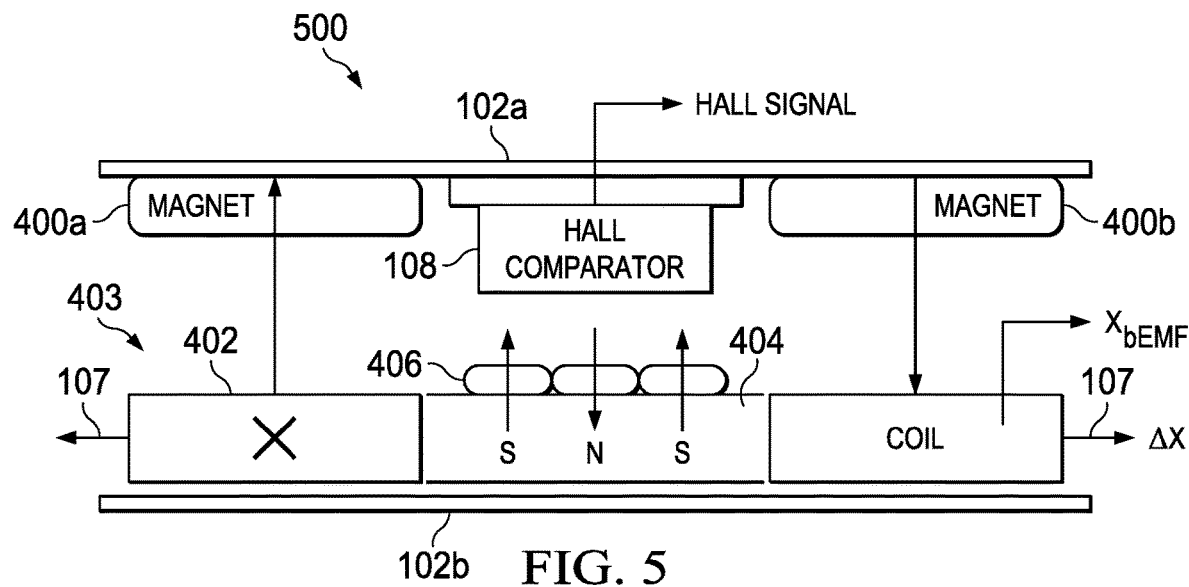
FIG. 5 is a cross-sectional view of an example single-sided, moving coil haptic engine that uses back EMF and a Hall comparator to estimate mass displacement, according to an embodiment.

FIG. 5 is a cross-sectional view of an example single-sided, moving coil haptic engine 500 that uses back EMF and a Hall comparator to estimate mass displacement, according to an embodiment. Haptic engine 500 includes magnets 400a, 400b mounted to frame portion 102a. Mass 403 is positioned within frame portions 102a, 102b. Mass 403 can be mechanically constrained (e.g., constrained by a shaft and/or other mechanical guides) to move linearly along movement axis 107 (x-axis) in two directions. Mass 403 includes coil 402 surrounding core 404. Sensing magnets 406 are mounted on core 404. Again, although three sensing magnets are shown, any arbitrary number of sensing magnets with alternating polarity can be used. Hall comparator 108 is mounted to frame portion 102a. Haptic engine 500 operates in a similar manner as haptic engine 400, except that haptic engine 500 does not include magnets 400c, 400d mounted to frame portion 102b.

Figure 6:
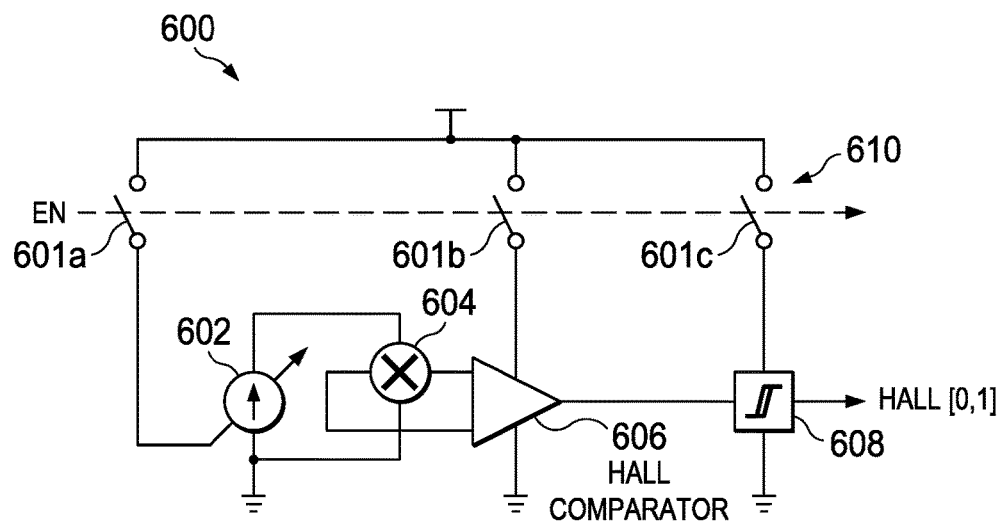
FIG. 6 is a circuit diagram of an example Hall comparator circuit, according to an embodiment.

FIG. 6 is diagram of an example Hall comparator circuit 600, according to an embodiment. Circuit 600 includes variable current source 602, Hall sensing element 604, amplifier 606 and Schmitt trigger 608. Current source 602, amplifier 606 and Schmitt trigger 608 can be selectively connected and disconnected by switches 601a-601c in response to an enable signal (EN). In an embodiment, Hall comparator 600 can be duty-cycled using the enable signal (EN) to save power. For example, the enable signal (EN) can be coupled to a pulse width modulation (PWM) circuit or processor that can control the duty-cycle of Hall comparator 600 using the enable signal (EN). Current source 602 is coupled to Hall sensing element 604. Amplifier 606 inputs are coupled to Hall sensing element 604 using a self-referenced configuration. When Hall sensing element 604 is subjected to a magnetic field, Hall sensor 604 generates a voltage which is amplified by amplifier 606. Schmitt trigger 608 is coupled to the output of amplifier 606 and outputs a binary signal (0 or 1) in response to the output of amplifier 606. A Schmitt trigger is a comparator circuit with hysteresis implemented by applying positive feedback to the noninverting input of a comparator or differential amplifier. It is an active circuit which converts an analog input signal to a digital output signal. In an embodiment, the hysteresis caused by Schmitt trigger 608 can be estimated in a state estimator to correct for delay in the Hall comparator output signal. Note that circuit 600 is an example embodiment and other circuit configurations using more or fewer components can be used to implement the Hall comparator.

Figure 7:
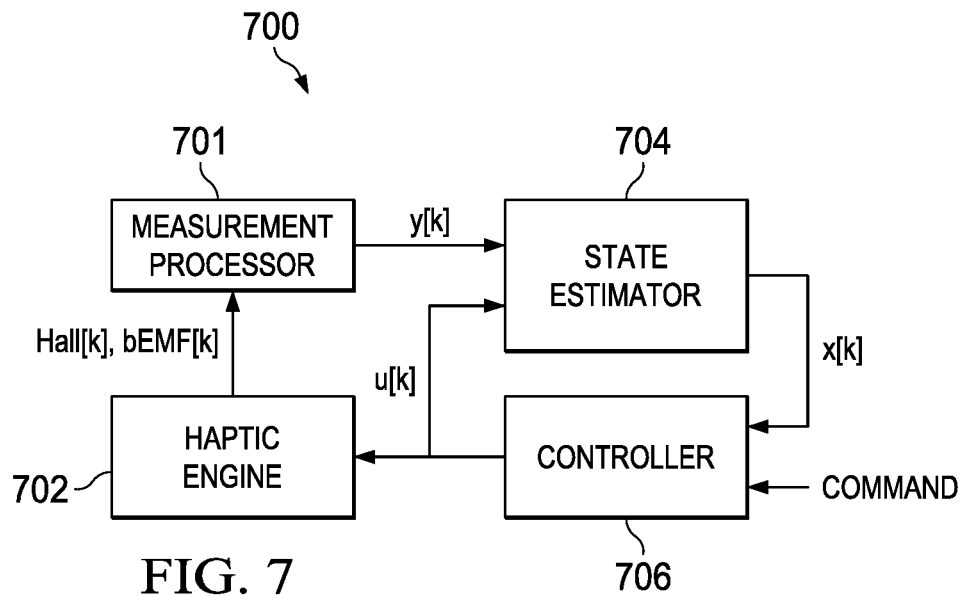
FIG. 7 is a block diagram of an example control system for a haptic engine that uses back EMF and Hall comparator output as measurement observations, according to an embodiment.

FIG. 7 is a block diagram of an example control system for a haptic engine using back EMF and Hall comparator measurements/observations to estimate mass displacement, according to an embodiment. Some portions of system 700 can be implemented in software or a combination of hardware or software.

In the example shown, system 700 includes measurement processor 701, haptic engine 702 (the plant), state estimator 704 and controller 706. In an embodiment measurement processor 701 is software that processes a digital back EMF measurement and Hall comparator output (Hall[k], bEMF[k]) to generate a combined measurement y[k] for use by state estimator 704 to estimate the plant state vector $\hat{x}[k]$. In an embodiment, measurement processor 701 can implement the following operations, described in pseudocode:

If Hall[k]-=Hall[k-1]
y[k]={$B_n$, $B_0$, $B_p$}, according to func1(Hall[k], bEMF[k])
else
y[k]=func2(bEMF[k]).

According to the pseudocode above, at each time k that Hall[k] changes from its previous state at time k−1, Hall[k] and bEMF[k] are combined to produce a measurement/observation y[k]. If Hall[k] does not change state (e.g., toggle) from its previous state at time k−1, then the back EMF voltage alone is used as the measurement/observation, i.e., y[k]=func2(bEMF[k]). The measurement/observation vector [k] is input into state estimator 704. The functions func1 and func2 have their own internal memories to record historical values of Hall[k] and bEMF[k], e.g., numerical integration of bEMF[k]: X_bEMF[k]=(X_bEMF[k−1]+ bEMF[k])/FS/km. In an embodiment, delay due to hysteresis of the Hall comparator can be compensated in the measurement processor 701. The func1 can be configured to lookup the value of $X_{bEMF}[k-d]$ where the variable "d" is the average Hall comparator delay in number of samples. Note that "d" can take on fractional values and $X_{bEMF}[k-d]$ can be evaluated by interpolation.

In an embodiment, state estimator can be state-observer or a filter (e.g., a Kalman filter). Assuming a full order state-observer formulation, we can model the haptic engine in state discrete-time state space using Equations [4] and [5]:

$$\hat{x}[k+1]=A\hat{x}[k]+Bu[k]+L(y[k]-\hat{y}[k]), \text{ and} \quad [4]$$

$$\hat{y}[k]=C\hat{x}[k]+Du[k], \quad [5]$$

where $\hat{x}[k]$ is the estimated haptic engine state vector, $\hat{y}[k]$ is the estimated haptic engine output vector, y[k] is the measured (actual) haptic engine output vector and u[k] is the haptic engine input vector. The matrices A, B, C and D have elements that can be determined based on the haptic engine dynamics and configuration. The computation of these matrices is known in control theory and is not particular to haptic engine design. The matrix L is the observer gain matrix and is used to weigh the error (difference) between the observed and estimated plant output vectors y[k], $\hat{y}[k]$. In a full order observer, the matrix L can be derived based on a desired pole placement using known state observer design procedures. Additionally, matrices A, B, C, D may be modified at run time based on established methods in Adaptive Control theory as well as methods using Mode Reference Adaptive Control. The purpose of varying these matrices is to more closely model the plant to track parameter variations such as module quality factor or coil resistance.

Controller 706 receives as input the estimated state vector $\hat{x}[k]$ and a command. For example, the haptic engine state vector typically includes a coil voltage, coil current, engine displacement, and engine velocity as a state and the command can be a command from, for example, a central processing unit (CPU), ASIC or DSP to drive the mass to a target displacement along the movement axis (e.g., drive the mass into vibration).

Figure 8:
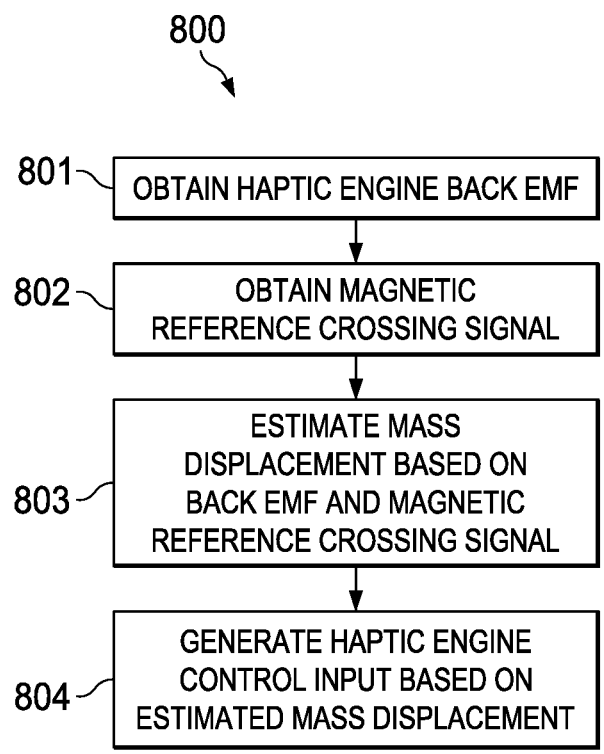
FIG. 8 is a flow diagram of an example process of estimating mass displacement using a haptic engine as described in reference to FIGS. 1-8, according to an embodiment.

FIG. 8 is a flow diagram of an example process 800 of estimating mass displacement using a haptic engine as described in reference to FIGS. 1-7, according to an embodiment. Process 800 can be implemented by, for example, the mobile architecture 900 described in reference to FIG. 9.

Process 800 can begin by obtaining back EMF voltage from a haptic engine (801). Process 800 can continue by obtaining a magnetic reference crossing signal from the haptic engine (802). Process 800 can continue by estimating mass displacement based on the back EMF voltage and the magnetic reference crossing signal (803). Process 800 then generates a haptic engine control input based on the estimated mass displacement (804).

Example Device Architecture

Figure 9:
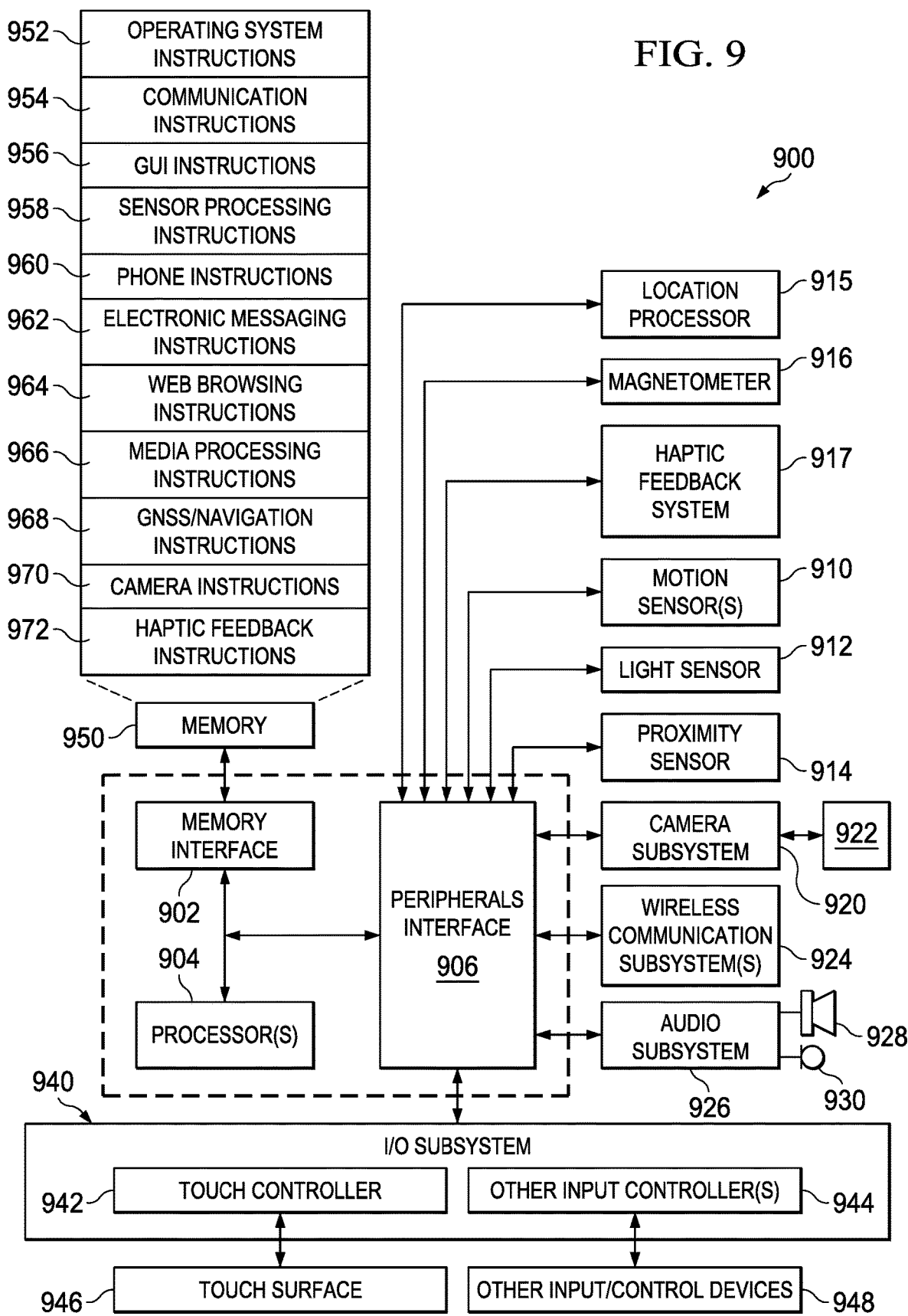
FIG. 9 is a diagram of an example mobile device architecture that uses a haptic engine as described in reference to FIGS. 1-7, according to an embodiment.

FIG. 9 is a diagram of an example mobile device architecture that uses one of the haptic engines described in reference to FIGS. 1-8, according to an embodiment.

Architecture 900 may be implemented in any mobile device for generating the features and processes described in reference to FIGS. 1-8, including but not limited to smart phones and wearable computers (e.g., smart watches, fitness bands). Architecture 900 may include memory interface 902, data processor(s), image processor(s) or central processing unit(s) 904, and peripherals interface 906. Memory interface 902, processor(s) 904 or peripherals interface 906 may be separate components or may be integrated in one or more integrated circuits. One or more communication buses or signal lines may couple the various components.

Sensors, devices, and subsystems may be coupled to peripherals interface 906 to facilitate multiple functionalities. For example, motion sensor(s) 910, light sensor 912, and proximity sensor 914 may be coupled to peripherals interface 906 to facilitate orientation, lighting, and proximity functions of the device. For example, in some embodiments, light sensor 912 may be utilized to facilitate adjusting the brightness of touch surface 946. In some embodiments, motion sensor(s) 910 (e.g., an accelerometer, rate gyroscope) may be utilized to detect movement and orientation of the device. Accordingly, display objects or media may be presented according to a detected orientation (e.g., portrait or landscape).

Haptic engine 917, under the control of haptic engine instructions 972, provides the features and performs the processes described in reference to FIGS. 1-8, such as, for example, implementing haptic feedback (e.g., vibration). Haptic engine 917 can include one or more actuators, such as piezoelectric transducers, electromechanical devices, and/or other vibration inducing devices, that are mechanically connected to an input surface (e.g., touch surface 946). Drive electronics coupled to the one or more actuators cause the actuators to induce a vibratory response into the input surface, providing a tactile sensation to a user touching or holding the device.

Other sensors may also be connected to peripherals interface 906, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 917 can be used as a temperature sensor.

Location processor 915 (e.g., GNSS receiver chip) may be connected to peripherals interface 906 to provide geo-referencing. Electronic magnetometer 916 (e.g., an integrated circuit chip) may also be connected to peripherals interface 906 to provide data that may be used to determine the direction of magnetic North. Thus, electronic magnetometer 916 may be used to support an electronic compass application.

Camera subsystem 920 and an optical sensor 922, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 924. Communication subsystem(s) 924 may include one or more wireless communication subsystems. Wireless communication subsystems 924 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 924 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 924 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 926 may be coupled to a speaker 928 and one or more microphones 930 to facilitate voice-enabled functions, such as voice recognition, voice replication, digital recording, and telephony functions. In an embodiment, audio subsystem includes a digital signal processor (DSP) that performs audio processing, such as implementing codecs. In an embodiment, the audio DSP implements at least some portions of control system 700 described in reference to FIG. 7.

I/O subsystem 940 may include touch controller 942 and/or other input controller(s) 944. Touch controller 942 may be coupled to a touch surface 946. Touch surface 946 and touch controller 942 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 946. In one embodiment, touch surface 946 may display virtual or soft buttons and a virtual keyboard, which may be used as an input/output device by the user.

Other input controller(s) 944 may be coupled to other input/control devices 948, such as one or more buttons, rocker switches, thumb-wheel, infrared port, USB port, and/or a pointer device such as a stylus. The one or more buttons (not shown) may include an up/down button for volume control of speaker 928 and/or microphone 930.

In some embodiments, device 900 may present recorded audio and/or video files, such as MP3, AAC, and MPEG video files. In some embodiments, device 900 may include the functionality of an MP3 player and may include a pin connector for tethering to other devices. Other input/output and control devices may be used.

Memory interface 902 may be coupled to memory 950. Memory 950 may include high-speed random access memory or non-volatile memory, such as one or more magnetic disk storage devices, one or more optical storage devices, or flash memory (e.g., NAND, NOR). Memory 950 may store operating system 952, such as Darwin, RTXC, LINUX, UNIX, OS X, iOS, WINDOWS, or an embedded operating system such as VxWorks. Operating system 952 may include instructions for handling basic system services and for performing hardware dependent tasks. In some embodiments, operating system 952 may include a kernel (e.g., UNIX kernel).

Memory 950 may also store communication instructions 954 to facilitate communicating with one or more additional devices, one or more computers or servers, including peer-to-peer communications. Communication instructions 954 may also be used to select an operational mode or communication medium for use by the device, based on a geographic location (obtained by the GPS/Navigation instructions 968) of the device.

Memory 950 may include graphical user interface instructions 956 to facilitate graphic user interface processing, including a touch model for interpreting touch inputs and gestures; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS (e.g., GPS, GLOSSNAS) and navigation-related processes and functions; camera instructions 970 to facilitate camera-related processes and functions; and haptic engine instructions 972 for commanding or controlling haptic engine 917 and to provide the features and performing the processes described in reference to FIGS. 1-8.

Each of the above identified instructions and applications may correspond to a set of instructions for performing one or more functions described above. These instructions need not be implemented as separate software programs, procedures, or modules. Memory 950 may include additional instructions or fewer instructions. Furthermore, various functions of the device may be implemented in hardware and/or in software, including in one or more signal processing and/or application specific integrated circuits (ASICs).

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic engine comprising:
   a frame;
   one or more magnetic field sources mounted to the frame and operable to generate a magnetic field and a back electromotive force (EMF) voltage;
   a magnetic mass positioned within the frame and operable to move within the frame along a movement axis;
   a comparator mounted to the frame, the comparator operable to detect the magnetic field and to generate a signal indicating a crossing of one or more magnetic references by the magnetic field; and
   a processor operable to implement a state estimator or filter for estimating a displacement of the magnetic mass on the movement axis based on measurements of the back EMF voltage and the signal from the comparator, wherein the state estimator or filter uses the signal from the comparator to correct the estimated mass displacement.

2. The haptic engine of claim 1, wherein the one or more magnetic field sources include one or more coils, the coils generating the magnetic field in response to current flowing through the one or more coils, and wherein the back EMF voltage is induced by the current flowing through the one or more coils.

3. The haptic engine of claim 2, wherein the frame includes two opposing frame portions that are parallel to the movement axis, and the magnetic mass is constrained to move between the frame portions in a direction parallel to the frame portions.

4. The haptic engine of claim 3, wherein one or more coils are mounted to one of the opposing frame portions.

5. The haptic engine of claim 3, wherein one or more coils are mounted to each of the opposing frame portions.

6. The haptic engine of claim 1, wherein the comparator is operable to toggle an output signal each time the magnetic reference is crossed.

7. The haptic engine of claim 6, wherein comparator includes a Hall sensing element.

8. The haptic engine of claim 7, wherein the comparator is duty cycled to save power.

9. The haptic engine of claim 7, wherein the comparator is a unipolar comparator.

10. The haptic engine of claim 7, wherein the comparator is an omnipolar comparator and the reference displacement is determined by a ratio of EMF sensed displacements at switching edges.

11. The haptic engine of claim 1, wherein the processor is configurable to compensate for hysteresis of the comparator.

12. A haptic engine comprising:
a frame;
a first set of magnets mounted to the frame;
a mass positioned within the frame and operable to move within the frame along a movement axis, the mass including a second set of magnets and one or more magnetic field sources operable to generate a magnetic field and a back electromotive force (EMF) voltage;
a comparator mounted to the frame, the comparator operable to detect the magnetic field and to generate a signal indicating a crossing of one or more magnetic references by the magnetic field; and
a processor coupled to one or more sensors and operable to implement a state estimator or filter for estimating a displacement of the magnetic mass on the movement axis based on measurements of the back EMF voltage and the signal from the comparator, wherein the state estimator or filter uses the signal from the comparator to correct the estimated mass displacement.

13. The haptic engine of claim 12, wherein the one or more magnetic field sources include one or more coils, the coils generating the magnetic field in response to current flowing through the one or more coils, and wherein the back EMF voltage is induced by the current flowing through the one or more coils.

14. The haptic engine of claim 13, wherein the frame includes two opposing frame portions that are parallel to the movement axis, and the magnetic mass is constrained to move between the frame portions in a direction parallel to the frame portions.

15. The haptic engine of claim 14, wherein one or more magnets in the first set of magnets are mounted to one of the opposing frame portions.

16. The haptic engine of claim 14, wherein one or more magnets in the first set of magnetics are mounted to each of the opposing frame portions.

17. The haptic engine of claim 12, wherein the comparator is operable to toggle an output signal each time the magnetic reference is crossed.

18. The haptic engine of claim 17, wherein comparator includes a Hall sensing element.

19. The haptic engine of claim 18, wherein the comparator is duty cycled to save power.

20. The haptic engine of claim 18, wherein the comparator is a unipolar comparator.

21. The haptic engine of claim 18, wherein the comparator is an omnipolar comparator and the reference displacement is determined by a ratio of EMF sensed displacements at switching edges.

22. The haptic engine of claim 12, wherein the processor is configurable to compensate for hysteresis of the comparator.

23. A method comprising:
generating, by one or more magnetic field sources mounted to a frame of a haptic engine, a magnetic field and a back electromotive force (EMF) voltage;
driving a mass to move within the frame along a movement axis, the movement of the mass inducing a back electromotive force (EMF) voltage;
detecting, using a comparator, at least a directional component of the magnetic field and generating a signal indicating a crossing of one or more magnetic references by the directional component of the magnetic field; and
estimating, using a state estimator or filter, a displacement of the magnetic mass on the movement axis based on measurements of the back EMF voltage and the signal from the comparator, wherein the state estimator or filter uses the signal from the comparator to correct the estimated mass displacement.

24. The method of claim 23, wherein the magnetic field sources are coils mounted to the frame and the mass includes magnetic portions.

25. The method of claim 23, wherein the magnetic field sources include at least one coil mounted to the mass and magnets are mounted to the frame and the mass.

26. The method of claim 23, wherein a unipolar or omnipolar comparator detects the at least one directional component of the magnetic field and generates a signal indicating a crossing of one or more magnetic references by the directional component of the magnetic field.

27. The method of claim 26, wherein the comparator is duty cycled to save power.

* * * * *